(12) United States Patent
Liu et al.

(10) Patent No.: US 12,533,846 B2
(45) Date of Patent: Jan. 27, 2026

(54) 3D PRINTING CONVEYING PLATFORM AND 3D PRINTER

(71) Applicant: Shenzhen Creality 3D Technology Co., Ltd., Shenzhen (CN)

(72) Inventors: Huilin Liu, Shenzhen (CN); Chengxuan Chen, Shenzhen (CN); Sheng-Yuan Lv, Shenzhen (CN)

(73) Assignee: Shenzhen Creality 3D Technology Co., Ltd., Shenzhen (CN)

( * ) Notice: Subject to any disclaimer, the term of this patent is extended or adjusted under 35 U.S.C. 154(b) by 91 days.

(21) Appl. No.: 18/711,257

(22) PCT Filed: Oct. 14, 2022

(86) PCT No.: PCT/CN2022/125502
§ 371 (c)(1),
(2) Date: May 17, 2024

(87) PCT Pub. No.: WO2023/088007
PCT Pub. Date: May 25, 2023

(65) Prior Publication Data
US 2025/0010545 A1    Jan. 9, 2025

(30) Foreign Application Priority Data

Nov. 18, 2021  (CN) .......................... 202122835133.9

(51) Int. Cl.
*B29C 64/245*   (2017.01)
*B33Y 30/00*   (2015.01)

(52) U.S. Cl.
CPC ............. *B29C 64/245* (2017.08); *B33Y 30/00* (2014.12)

(58) Field of Classification Search
CPC ..... B29C 64/118; B29C 64/236; B29C 64/20; B29C 64/209; B22F 10/10; B22F 12/30; B22F 12/53; B33Y 30/00
See application file for complete search history.

(56) References Cited

U.S. PATENT DOCUMENTS

| | | |
|---|---|---|
| 2013/0284567 A1 | 10/2013 | Beltman et al. |
| 2019/0366743 A1 | 12/2019 | Terradellas Callau et al. |
| 2021/0101391 A1 | 4/2021 | Van De Sande et al. |
| 2021/0380347 A1* | 12/2021 | Hertel .................... B65G 39/16 |

* cited by examiner

*Primary Examiner* — Galen H Hauth
*Assistant Examiner* — Mohamed K Ahmed Ali
(74) *Attorney, Agent, or Firm* — ScienBiziP, P.C.

(57) ABSTRACT

A 3D printing conveying platform includes a conveyor belt and a drive assembly driving the conveyor belt in a first direction, a base, a follower assembly and a movable component. The drive assembly is mounted to the base. The follower assembly is disposed opposite the drive assembly in the first direction, the conveyor belt is drive connected to the follower assembly. The movable component includes a first movable member and a second movable member connected to each other, the first movable member is connected to the follower assembly, the second movable member is movably disposed between the first movable member and the base and connected to the first movable member and the base, such that the follower assembly is capable of oscillating in a second direction relative to the base. The present application also provides a 3D printer.

13 Claims, 3 Drawing Sheets

3D PRINTING CONVEYING PLATFORM AND 3D PRINTER

This application claims priority to Chinese patent application No. 202122835133.9, filed with the Chinese Patent Office on Nov. 18, 2021, and entitled "3D Printing Transfer Platform and 3D Printer," the entire contents of which are incorporated herein by reference.

FIELD

The subject matter relates to the technical field of 3D printing equipment, and in particular, to a 3D printing conveying platform and a 3D printer.

BACKGROUND

Since its introduction, 3D printing technology has been rapidly developed and widely used due to its informatization, digitalization and high efficiency. In recent years, the emergence of infinite Z-axis 3D printers has attracted much attention for its feature of being able to print products of infinite length in the Z-axis direction.

However, the existing infinite 3D printers conveying platform, in the actual use of the process, there are installation complexity, the use of a period of time after the conveyor belt offset thus affecting the printing accuracy of the defects.

SUMMARY

In view of the above, it is necessary to propose a 3D printing conveying platform and a 3D printer to solve the above problems.

Embodiments of the present application provide a 3D printing conveying platform includes a conveyor belt and a drive assembly drives the conveyor belt in a first direction. A base, the drive assembly is mounted to the base. A follower assembly, the follower assembly is disposed opposite the drive assembly in the first direction, the conveyor belt is drive connected to the follower assembly. A movable assembly comprises a first movable member and a second movable member connected to each other, the first movable member connect the follower assembly, the second movable member is movably disposed between the first movable member and the base and connected the first movable member to the base, the follower assembly is capable of being oscillated in a second direction with respect to the base, the second direction intersects the first direction.

In one possible embodiment, the movable assembly further includes a catch pin, one end of the first movable member is fixedly connected to the follower assembly, and another end of the first movable member is rotationally connected to the catch pin; and one end of the second movable member is fixedly connected to the base, and another end of the second movable member is rotationally connected to the catch pin, to cause the follower assembly to swing around the catch pin.

In one possible embodiment, the movable assembly further includes a first adjusting member, the first adjusting member is detachably connected to the base, in the first direction, the first adjusting member runs through the base and connects to the second movable member.

In one possible embodiment, the base further includes a conveyor frame, the conveyor frame is connected to the drive assembly, and the conveyor frame is disposed between the drive assembly and the follower assembly.

In one possible embodiment, the conveyor frame includes a first beam and a second beam disposed in the first direction, and a connecting beam connecting the first beam to the second beam, one end of the first beam is connected to the drive assembly.

In one possible embodiment, the conveyor frame includes a second adjustable member, in the first direction, the second adjustable member is adjustably connected to the drive assembly and the base.

In one possible embodiment, the conveyor frame further includes a heating block, the heating block is disposed between the first beam and the second beam.

In one possible embodiment, the base includes a first support frame, a second support frame, and a connecting rod, the first support frame and the second support frame are set opposite to each other, one end of the first support frame and one end of the second support frame are connected to the driving assembly respectively, and the follower assembly is set between the first support frame and the second support frame; the connecting rod connects the first support frame and the second support frame.

In one possible embodiment, the base further includes a third support frame, the third support frame is connected to the first support frame and to an end of the second support frame away from the drive assembly, the movable assembly is disposed between the third support frame and the follower assembly and connected to the third support frame and the follower assembly.

In one possible embodiment, further includes a print head assembly, a print head moving frame, and a 3D printing conveying platform as described above, the print head moving frame being disposed on the 3D printing transport platform, and the print head assembly being disposed on the print head moving frame.

The 3D printing conveying platform proposed in this application makes the conveyor belt have an adaptive adjustment function by connecting the movable component to the follower component and the base, solves the problem that the conveyor belt is deflected and tilted, improves the ease of use and stability, and ensures the printing accuracy.

DESCRIPTION OF MAIN COMPONENT SYMBOLS

Figure 1:
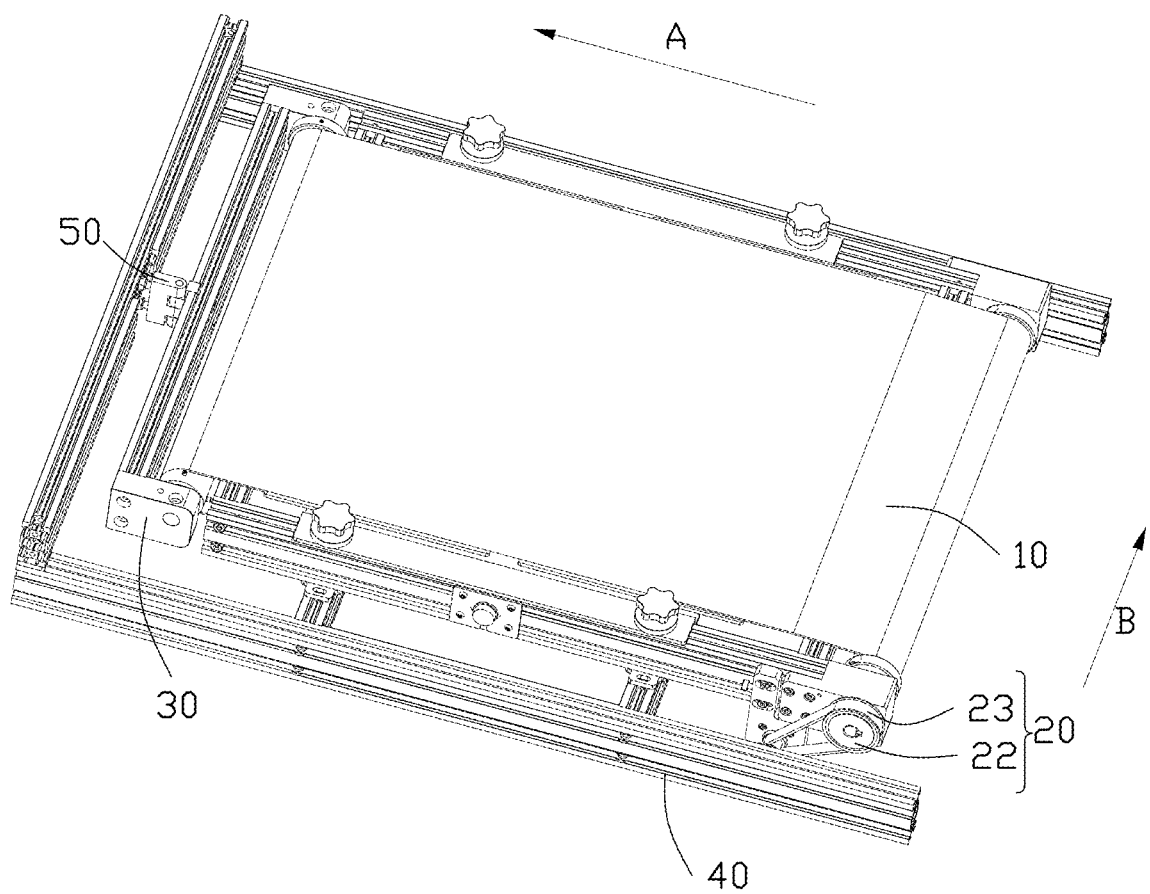
FIG. 1 is a schematic structural view of a 3D printing conveying platform in the present application.

3D Printing Conveying platform 100
conveyor belt 10
drive assembly 20
power unit 21
synchronous belt 22
drive roller 23
follower assembly 30
follower drum 31
follower frame 32
base 40
first support frame 41
second support frame 42
third support frame 43
connecting rod 44 conveyor frame 45
first beam 451
second beam 452
connecting beam 453
second adjusting member 454
locating member 455
heating block 456
movable component 50
first movable member 51
second movable member 52
snap pin 53
first adjusting member 54
printhead assembly 200
printhead moving frame 300
3D printer 400

DETAILED DESCRIPTION

In order to make the purpose, technical solutions and advantages of the present application more clearly understood, the following is a further detailed description of the present application in conjunction with the accompanying drawings and embodiments. It should be understood that the specific embodiments described herein are only for explaining the present application and are not intended to limit the present application. Based on the embodiments in this application, all other embodiments obtained by a person of ordinary skill in the art without creative labor fall within the scope of protection of this application.

In the description of the present application, it is to be understood that the terms "center", "longitudinal", "transverse", "length", "width", "thickness", "up", "down", "front", "back", "left", "right", "vertical", "horizontal", "top", "bottom", "inside", "outside", "clockwise", "counterclockwise", etc. indicate orientations or positional relationships based on those shown in the accompanying drawings, and are intended solely for the purpose of facilitating the description of the application and simplifying the description, and are not intended to indicate or imply that the referenced It is not intended to indicate or imply that the device or element referred to must have a particular orientation, be constructed and operated in a particular orientation, and therefore is not to be construed as a limitation of the present application. Furthermore, the terms "first" and "second" are used only for descriptive purposes and are not to be understood as indicating or implying relative importance or implicitly specifying the number of technical features indicated. Thus, a feature defined with "first", "second" may expressly or implicitly include one or more of the described features. In the description of this application, "more than one" means two or more, unless otherwise expressly and specifically limited.

In the description of the present application, it is to be noted that, unless otherwise expressly specified and qualified, the terms "mounted", "connect to", "connected" are to be understood in a broad sense, e.g., they can be For example, it may be a fixed connection, a removable connection, or a connection in one piece; it may be a mechanical connection, an electrical connection or a connection that can communicate with each other; it may be a direct connection or an indirect connection through an intermediate medium; it may be a connection within the two elements or an interaction between the two elements. For those of ordinary skill in the art, the specific meaning of the above terms in this application may be understood on a case-by-case basis.

For the purposes of this application, unless otherwise expressly provided and limited, "over" or "under" the first feature of the second feature may include direct contact between the first and second features, or it may include contact between the first and second features not directly, but by means of a separate feature between them, or it may include contact between the first and second features. Furthermore, the first feature being "above", "above" and "above" the second feature includes the first feature being directly above and diagonally above the second feature, or simply indicating that the first feature is horizontally higher than the second feature. above the second feature. The first feature being "below", "under", and "underneath" the second feature includes the first feature being directly above and diagonally above the second feature, or simply means that the first feature is horizontally smaller than the second feature. second feature.

The following disclosure provides many different implementations or examples used to realize the different structures of the present application. In order to simplify the disclosure of the present application, the parts and settings of particular examples are described below. They are, of course, only examples and are not intended to limit the present application. In addition, the present application may repeat reference numerals and/or reference letters in various examples, such repetition being for purposes of simplification and clarity and not in itself indicative of a relationship between the various implementations and/or settings discussed. In addition, various specific examples of processes and materials are provided in this application, but one of ordinary skill in the art may realize the application of other processes and/or the use of other materials.

Figure 2:
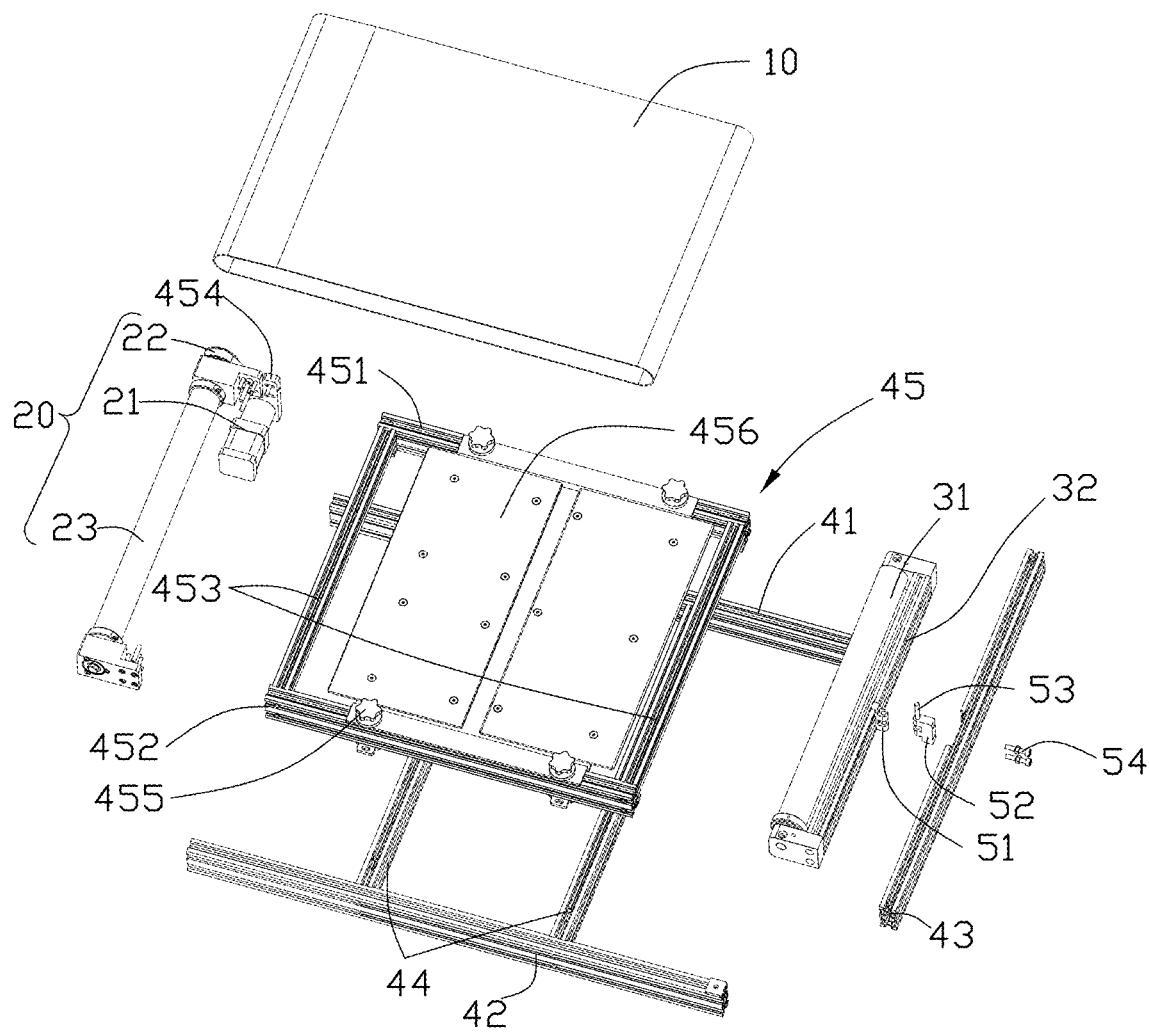
FIG. 2 is a schematic view of an exploded structure of the 3D printing conveying platform shown in FIG. 1.

Referring to FIGS. 1 and 2, a embodiment of the present application provides a 3D printing conveying platform 100. The 3D printing conveying platform 100 includes a conveyor belt 10 and a drive assembly 20 that drives the conveyor belt 10 in a first direction A. The 3D printing conveying platform 100 further includes a base 40, with the drive assembly 20 being mounted to the base 40. The 3D printing conveying platform 100 further includes a follower assembly 30, with the follower assembly 30 being disposed opposite the drive assembly 20 in the first direction A, the conveyor belt 10 is connected to the drive. The 3D printing conveying platform 100 further includes a movable component 50, the movable component 50 includes a first movable member 51 and a second movable member 52 connected to each other, the first movable member 51 is connected to the follower assembly 30, the second movable member 52 is movably disposed between the first movable member 51 and the base 40, the second movable member 52 is connected to the first movable member 51 and the base 40. The follower assembly 30 is movable to oscillate relative to the base 40 in the second direction B, the second direction B is substantially perpendicular to the first direction A.

Referring to FIGS. 1 and 2, the drive assembly 20 includes a drive roller 23, a power unit 21 and a synchronous belt 22 connected in a transmission. The power unit 21 drives the drive roller 23 to rotate to drive the conveyor belt 10 to rotate by means of the synchronous belt 22, thereby driving the product to be printed to move in a first direction A. The first direction A is perpendicular to the axial direction of the conveyor belt 10, as shown in FIG. 1. The first direction is A perpendicular to the axial direction of the drive roller 23, as shown in FIG. 1. The follower assembly 30 includes a follower drum 31 and a follower frame 32 connected to the follower drum 31. In existing conveying platforms, the conveyor belt 10 is subject to lateral deflections during transmission due to wear and tear of the components after a certain period of time of use, or due to certain tolerances in the thickness and the width of the conveyor belt 10 at certain places. The movable component 50 is connected to the follower assembly 30 and the base 40, so that when the conveyor belt 10 is shifted to one side, the follower assembly 30 swings in the second direction B, so that even if the two sides of the conveyor belt 10 have different perimeters for one weeks transmission, the time taken for one weeks rotation of the conveyor belt 10 is the same for both sides, so that the conveyor belt 10 as a whole maintains a stable transmission and does not shift further to one side, so that the precision of the printing is guaranteed, and the function of self-adaptive adjustment is realized. Due to the slight oscillation of the follower assembly 30 around a point, the second direction B of its movement is a relatively straight arc around the movable component 50, and is basically perpendicular to the first direction A.

Referring to FIG. 2, in an embodiment, the base 40 includes a first support frame 41, a second support frame 42 and a connecting rod 44, the first support frame 41 and the second support frame 42 are disposed opposite to each other, one end of the first support frame 41 and one end of the second support frame 42 are connected to the drive assembly 20, and the follower assembly 30 is disposed between the first support frame 41 and the second support frame 42. A connecting rod 44 connects the first support frame 41 and the second support frame 42, and the connecting rod 44 is substantially perpendicular to the first support frame 41 and the second support frame 42.

In this embodiment, the first support frame 41 and the second support frame 42 are provided substantially parallel to two sides of the conveyor belt 10, and the connecting rod 44 is provided between the first support frame 41 and the second support frame 42, and the connecting rod 44 is substantially perpendicular to the first support frame 41 and the second support frame 42. An angle of the first support frame 41 and the second support frame 42 ranging from 0-5° can be considered substantially parallel.

In one embodiment, the base 40 further includes a third support frame 43, the third support frame 43 is connected to the ends of the first support frame 41 and the second support frame 42 away from the drive assembly 20, and the movable component 50 is disposed between the third support frame 43 and the follower frame 32 of the follower assembly 30, the movable component 50 is connected to the third support frame 43 and the follower assembly 30.

The third support frame 43 in this embodiment is substantially perpendicular to the first support frame 41 and the second support frame 42, and the third support frame 43 is in a horizontal plane with the follower assembly 30, the drive assembly 20, and the conveyor belt 10. The movable component 50 is connected to the third support frame 43 and the follower assembly 30, the follower assembly 30 is capable of swing within a certain range in the horizontal plane.

In one embodiment, the second movable member 52 is disposed between the first movable member 51 and the third support frame 43, the second movable member 52 is connected to the first movable member 51 and the third support frame 43, and the first movable member 51 is rotationally connected to the second movable member 52.

It is to be explained that in this embodiment, the first movable member 51 and the second movable member 52 are rotationally connected by the snap pin 53, the first movable member 51 is fixedly connected to the follower frame 32, and the second movable member 52 is fixedly connected to the third support frame 43, so as to realize that the follower assembly 30 oscillates in a certain range in the horizontal plane around the snap pin 53. The shapes of the joints of the first movable member 51 and the second movable member 52 are matched, and in this embodiment, both movable members are provided with protrusions, and the snap pins 53 extends through both protrusions to connect the first movable member 51 and the second movable member 52.

In one embodiment, the movable component 50 further includes a first adjusting member 54, the first adjusting member 54 is detachably connected to the third support frame 43, the first adjusting member 54 is penetrated through the third support frame 43 and connected to the second movable member 52 in the first direction A. The first adjusting member 54 in this embodiment includes, but is not limited to, an adjusting screw, by adjusting the adjusting screw it is possible to change the distance between the follower frame 32 and the third support frame 43, and thus the amount of tension of the conveyor belt 10, and thus the swing range of the follower assembly 30 in the horizontal plane. In this embodiment, one end of the first adjusting member 54 is pierced and threaded at the midpoint of the third support frame 43, and the other end of the first adjusting member 54 is connected to the second movable member 52.

In the course of use, due to design tolerances, wear and tear, etc., the movement stroke of the conveyor belt 10 is different on both sides, and the conveyor belt 10 is deflected to one side, so the conveyor belt 10 generates a deflecting torque. By the action of the deflecting torque, the conveyor belt 10 drives the follower assembly 30 to offset in the same direction. Since the position of the drive assembly 20 is relatively fixed, when the follower assembly 30 is deflected and tilted, the travel required to rotate the conveyor belt 10 on both sides for one week changes. The offsetting process continues until the difference between the actual rotation of the two sides of the conveyor belt 10 is just offset by the difference in travel brought about by the offsetting of the follower assembly 30, and the conveyor belt 10 reaches a new balance of motion, which realizes dynamic adjustment in motion, reduces frequent adjustments to the 3D printing conveying platform 100, and improves the convenience of use.

In one embodiment, the base 40 further includes a conveyor frame 45 coupled to the drive assembly 20, and the conveyor frame 45 is disposed between the drive assembly 20 and the follower assembly 30.

In one embodiment, the conveyor frame 45 includes a first beam 451 and a second beam 452 disposed in the first direction A. The conveyor frame 45 includes a connecting beam 453, the connecting beam 453 is connected to the first beam 451 and the second beam 452. An end of the first beam 451 is connected to the drive assembly 20. The power unit 21 of the drive assembly 20 is disposed at the bottom of one end of the first beam 451.

In one embodiment, the conveyor frame 45 includes a second adjusting member 454 that moves to connect the drive assembly 20 to the first beam 451 in the first direction A. The second adjusting member 454 includes, but is not limited to, removable screws that are attached between the first beam 451 and the drive assembly 20. When the second adjusting member 454 is installed, the drive assembly 20 is fixedly connected to the connecting beam 453. The user can adjust the second adjusting member 454 to move the drive assembly 20 so as to maintain the level of the conveyor belt 10, simplify the installation process, and ensure that the direction of movement of the product along the conveyor belt 10 during the printing process is horizontal so as to ensure the quality of the printing. In addition, when the 3D printing conveying platform 100 is used for a period of time and the conveyor belt 10 becomes slack, the distance between the drive assembly 20 and the follower assembly 30 is adjusted by adjusting the looseness or tightness of the second adjusting member 454, so that the drive assembly 20 and the follower assembly 30 are tightly adhered to the inner circle of the conveyor belt 10, so that both sides of the conveyor belt 10 are subjected to equal pressure, and the conveyor belt 10 is tightened again, so as to ensure the transmission effect of the conveyor belt 10.

In one embodiment, the conveyor frame 45 further includes a heating block 456, the heating block 456 is disposed between the first beam 451 and the second beam 452, and the conveyor belt 10 wraps around the heating block 456. The heating block 456 is configured to ensure an ambient temperature during the printing process to ensure the quality of the printing.

The conveyor frame 45 further includes a locating member 455, which extends through the first beam 451 and the second beam 452 and is connected to the connecting rod 44. This embodiment includes four locating members 455, two locating members 455 are positioned on the first beam 451 and other two locating members 455 are positioned on the second beam 452, to secure the conveyor frame 45 to the connecting rod 44 in the base 40. The locating members 455 can be screw, which is connected to the conveyor frame 45 and the connecting rod 44 by means of threaded connections, and the threaded connections have the advantage of easy installation and easy adjustment.

Figure 3:
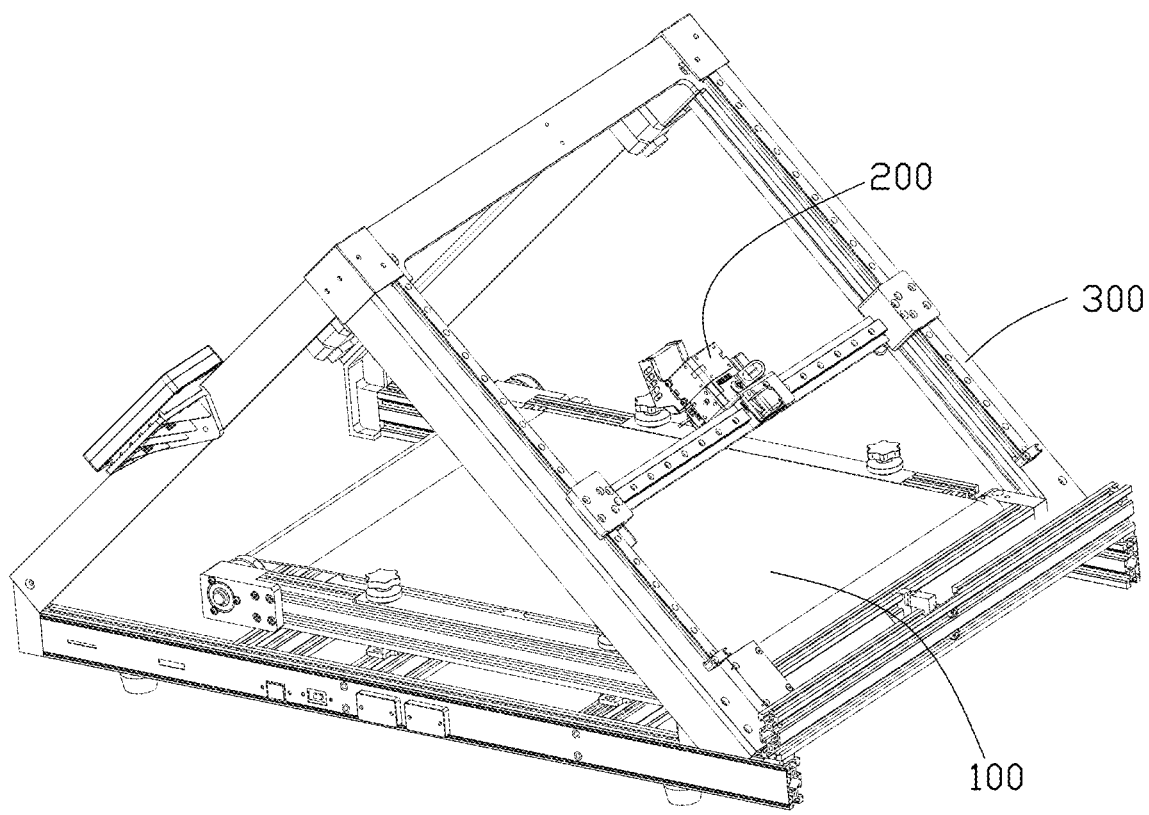
FIG. 3 is a schematic view of the structure of an embodiment of a 3D printer in the present application.

Referring to FIG. 3, embodiments of the present application also provide a 3D printer 400, the 3D printer 400 includes a printhead assembly 200, a printhead moving frame 300, and a 3D printing conveying platform 100 as above, the printhead moving frame 300 is disposed on the 3D printing conveying platform 100, and the printhead assembly 200 is disposed on the printhead moving frame 300. The base 40 may be a separately disposed base of the 3D printing conveying platform 100 or may be fused with a base of the 3D printer 400. The printhead moving frame 300 and the 3D printing conveying platform 100 substantially form a three-pronged column, and the printhead assembly 200 is movably disposed on one side of the printhead moving frame 300 to print the product to be printed onto the 3D printing conveying platform 100. The 3D printing conveying platform 100 continuously rotates, conveys the product to be printed in the first direction A, and the conveying speed is adapted to the printing speed so that the print head is able to print a complete product. The 3D printer 400 is characterized by the ability to print products of unlimited length in the first direction A. Unlike conventional 3D printer 400, which are limited to the size of the 3D printer 400, the 3D printer 400 is able to meet the needs of longer, non-conventional sized products.

It is apparent to those skilled in the art that the present application is not limited to the details of the exemplary embodiments described above, and that it is capable of being realized in other specific forms without departing from the spirit or essential features of the present application. Therefore, the embodiments should be regarded as exemplary and non-limiting from any point of view.

The above embodiments are only used to illustrate the technical solutions of the present application and are not intended to be limiting, and although the present application has been described in detail with reference to the preferred embodiments, a person of ordinary skill in the art should understand that modifications or equivalent substitutions may be made to the technical solutions of the present application without departing from the spirit and scope of the technical solutions of the present application.

What is claimed is:

1. A 3D printing conveying platform comprising:
   a conveyor belt;
   a drive assembly driving the conveyor belt in a first direction;
   a base, the drive assembly is mounted to the base;
   a follower assembly disposed opposite the drive assembly in the first direction, the conveyor belt being drive connected to the follower assembly; and
   a movable assembly comprising a first movable member and a second movable member connected to each other, wherein the first movable member connects the follower assembly, the second movable member is movably disposed between the first movable member and the base and connected the first movable member to the base, the follower assembly is configured to be oscillated in a second direction with respect to the base, the second direction intersects the first direction; wherein the movable assembly further comprises a catch pin, one end of the first movable member is fixedly connected to the follower assembly, and another end of the first movable member is rotationally connected to the catch pin; and one end of the second movable member is fixedly connected to the base, and another end of the second movable member is rotationally connected to the catch pin, to cause the follower assembly to swing around the catch pin.

2. The 3D printing conveying platform of claim 1, wherein the movable assembly further comprises a first adjusting member, the first adjusting member is detachably connected to the base, in the first direction, the first adjusting member runs through the base and connects to the second movable member.

3. The 3D printing conveying platform of claim 1, wherein the base further comprises a conveyor frame, the conveyor frame is connected to the drive assembly, and the conveyor frame is disposed between the drive assembly and the follower assembly.

4. The 3D printing conveying platform of claim 3, wherein the conveyor frame comprises a first beam and a second beam disposed in the first direction, and a connecting beam connecting the first beam to the second beam, one end of the first beam is connected to the drive assembly.

5. The 3D printing conveying platform of claim 3, wherein the conveyor frame comprises a second adjustable member, in the first direction, the second adjustable member is adjustably connected to the drive assembly and the base.

6. The 3D printing conveying platform of claim 4, wherein the conveyor frame further comprises a heating block, the heating block is disposed between the first beam and the second beam.

7. The 3D printing conveying platform of claim 1, wherein the base comprises a first support frame, a second support frame, and a connecting rod, the first support frame and the second support frame are set opposite to each other, one end of the first support frame and one end of the second support frame are connected to the driving assembly respectively, and the follower assembly is set between the first support frame and the second support frame; the connecting rod connects the first support frame and the second support frame.

8. The 3D printing conveying platform of claim 7, wherein the base further comprises a third support frame, the third support frame is connected to the first support frame and to an end of the second support frame away from the drive assembly, the movable assembly is disposed between the third support frame and the follower assembly and connected to the third support frame and the follower assembly.

9. A 3D printer comprises a print head assembly, a print head moving frame and a 3D printing transport platform, the print head moving frame being disposed on the 3D printing transport platform, and the print head assembly being disposed on the print head moving frame; wherein the 3D printing conveying platform comprises:

a conveyor belt; a drive assembly driving the conveyor belt in a first direction;

a base, the drive assembly is mounted to the base;

a follower assembly, the follower assembly is disposed opposite the drive assembly in the first direction, the conveyor belt is drive connected to the follower assembly; and a movable assembly comprises a first movable member and a second movable member connected to each other, wherein the first movable member connects the follower assembly, the second movable member is movably disposed between the first movable member and the base and connected the first movable member to the base, the follower assembly is configured to be oscillated in a second direction with respect to the base, the second direction intersects the first direction; wherein the movable assembly further comprises a catch pin, one end of the first movable member is fixedly connected to the follower assembly, and another end of the first movable member is rotationally connected to the catch pin; and one end of the second movable member is fixedly connected to the base at one end, and another end of the second movable member is rotationally connected to the catch pin, to cause the follower assembly to swing around the catch pin.

10. The 3D printer of claim 9, wherein the movable assembly further comprises a first adjusting member, the first adjusting member is detachably connected to the base, in the first direction, the first adjusting member runs through the base and connected to the second movable member.

11. The 3D printer of claim 9, wherein the base further comprises a conveyor frame, the conveyor frame is connected to the drive assembly, and the conveyor frame is disposed between the drive assembly and the follower assembly.

12. The 3D printer of claim 11, wherein the conveyor frame comprises a second adjustable member, in the first direction, the second adjustable member is adjustably connected to the drive assembly and the base.

13. The 3D printer of claim 9, wherein the base comprises a first support frame, a second support frame and a connecting rod, the first support frame and the second support frame are set opposite to each other, one end of the first support frame and one end of the second support frame are connected to the driving assembly respectively, and the follower assembly is set between the first support frame and the second support frame; the connecting rod connects the first support frame and the second support frame.

* * * * *